Aug. 29, 1967 G. M. HOLUB 3,337,961
WHEEL CHECKING INSTRUMENT
Filed April 30, 1965 4 Sheets-Sheet 2

INVENTOR.
GEORGE M. HOLUB
BY
ATTORNEYS

Aug. 29, 1967   G. M. HOLUB   3,337,961
WHEEL CHECKING INSTRUMENT
Filed April 30, 1965   4 Sheets-Sheet 3
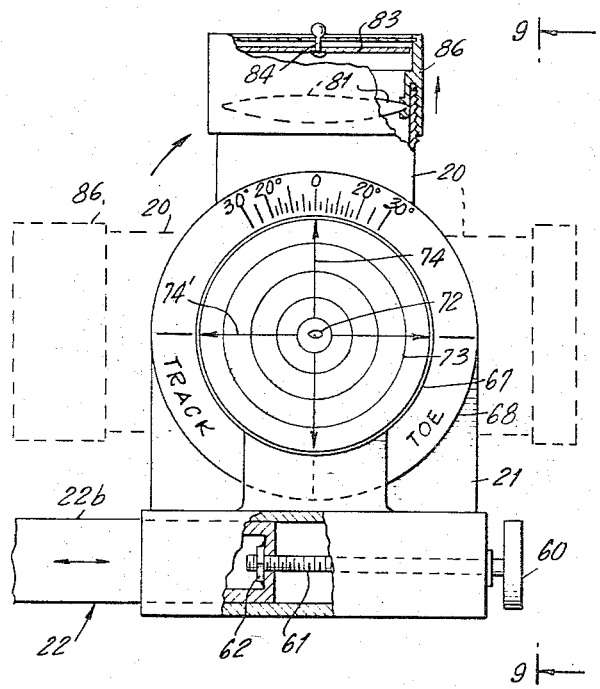
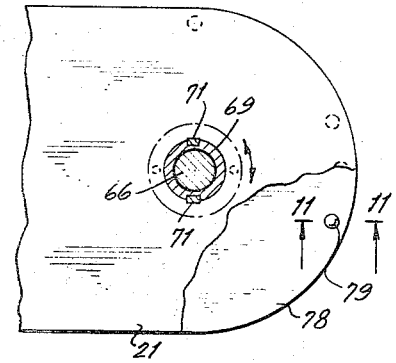
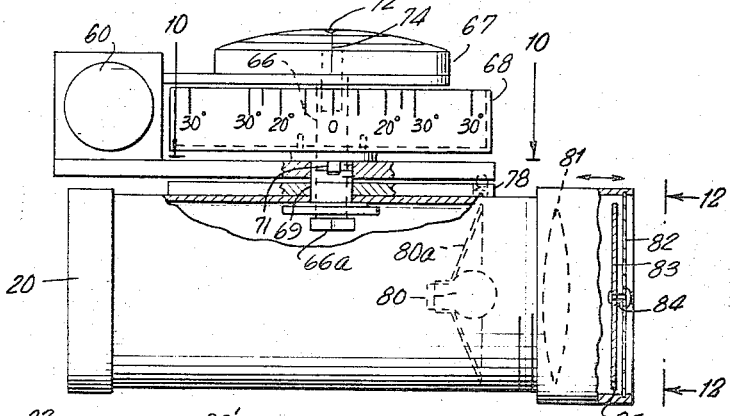
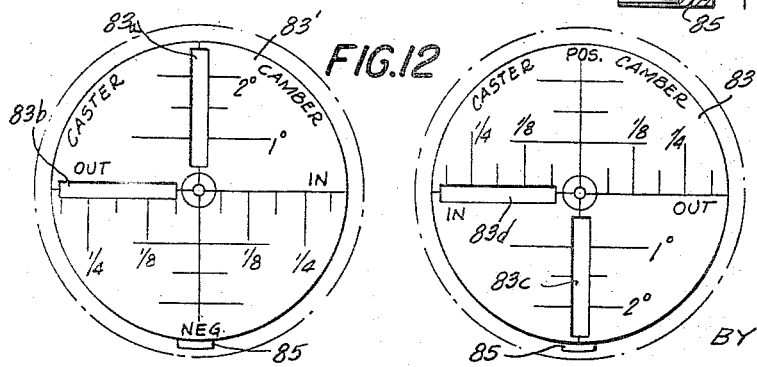
INVENTOR.
GEORGE M. HOLUB
BY Brumbaugh, Free,
Graves & Donohue
ATTORNEYS

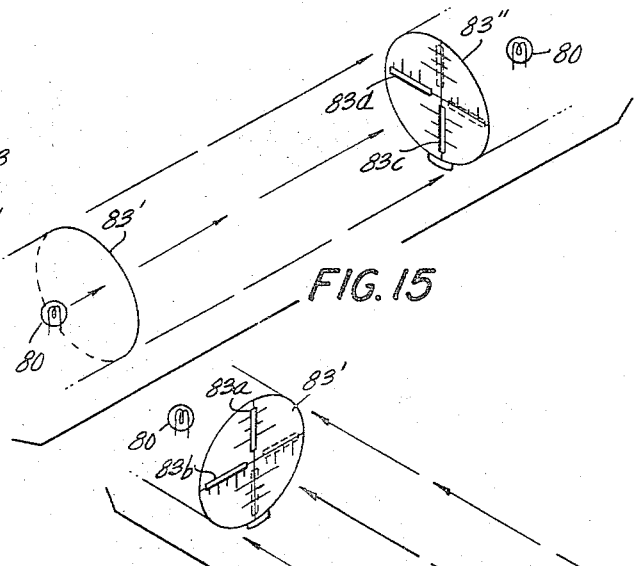

United States Patent Office 3,337,961
Patented Aug. 29, 1967

3,337,961
WHEEL CHECKING INSTRUMENT
George M. Holub, 2396 Cambridge St.,
East Meadow, N.Y. 11554
Filed Apr. 30, 1965, Ser. No. 452,134
19 Claims. (Cl. 33—46)

ABSTRACT OF THE DISCLOSURE

The specification describes a wheel checking instrument which includes a pair of light projectors which are mounted from the front wheels of a vehicle in positions in front of and to each side of the vehicle and each projector is rotatable on an upright axis so as to direct its light beam either across the front of the vehicle on a target or along the side of the vehicle to a target at the rear.

This invention relates to a novel, simple, inexpensive and accurate instrument for checking and measuring, inter alia, wheel alignments, tracking and the condition and relation of the frame, the front end and the rear housing of automobiles and other vehicles.

The instrument includes a pair of rotatable reference line projectors which are mounted to opposite wheels of the vehicle and which are each capable of projecting a reference line parallel to the respective wheel axis or at adjusted angles with respect to the wheel axis, means for checking the direction of the projected reference line with respect to the wheel axis and means for comparing the relationship of the reference lines projected by the projectors. The reference line or lines can be projected in a transverse direction from one side of the vehicle to the other and read on a scale on the side opposite the projector projecting the reference line, e.g., to check camber, caster and toe-in, or the reference line can be projected in a fore-and-aft direction from one end of the vehicle to the other, e.g., to check tracking.

For a complete understanding of the present invention, the features and the wide utility thereof, reference should be made to the detailed description which follows and to the accompanying drawings, in which:

FIGURE 1 is a top plan view of wheel checking instrument of the present invention showing it mounted on an automobile;

FIGURES 2 and 3 are views taken along the lines 2—2 and 3—3, respectively, of FIGURE 1 looking in the direction of the arrows;

FIGURES 4 and 5 are views taken along the lines 4—4 and 5—5, respectively, of FIGURE 2 looking in the direction of the arrows;

FIGURES 6 and 7 are views taken along the lines 6—6 and 7—7, respectively, of FIGURE 5 looking in the direction of the arrows;

FIGURE 8 is an enlarged plan view partly broken away of part of the instrument of the present invention;

FIGURE 9 is a view taken along the line 9—9 of FIGURE 8 looking in the direction of the arrows;

FIGURE 10 is a view taken along the line 10—10 of FIGURE 9 looking in the direction of the arrows;

FIGURE 11 is a view taken along the line 11—11 of FIGURE 10 looking in the direction of the arrows;

FIGURE 12 is a face view of a disc used in the instrument and viewed from the line 12—12 of FIGURE 9 looking in the direction of the arrows;

FIGURE 13 is a face view of a disc which is part of the instrument mounted on the opposite side of the vehicle;

FIGURE 14 is a view of a target adapted to be mounted on the rear wheel of the vehicle;

FIGURES 15 and 16 are schematic views showing how light images are directed from the instrument mounted on one side of the vehicle to the instrument on the other side;

FIGURE 17 is a view taken along the line 17—17 of FIGURE 2 looking in the direction of the arrows;

FIGURE 18 is a view similar to FIGURE 2 showing a modified form of the instrument; and FIGURE 19 is a fragmentary perspective view of part of the instrument shown in FIGURE 18.

Figure 1:
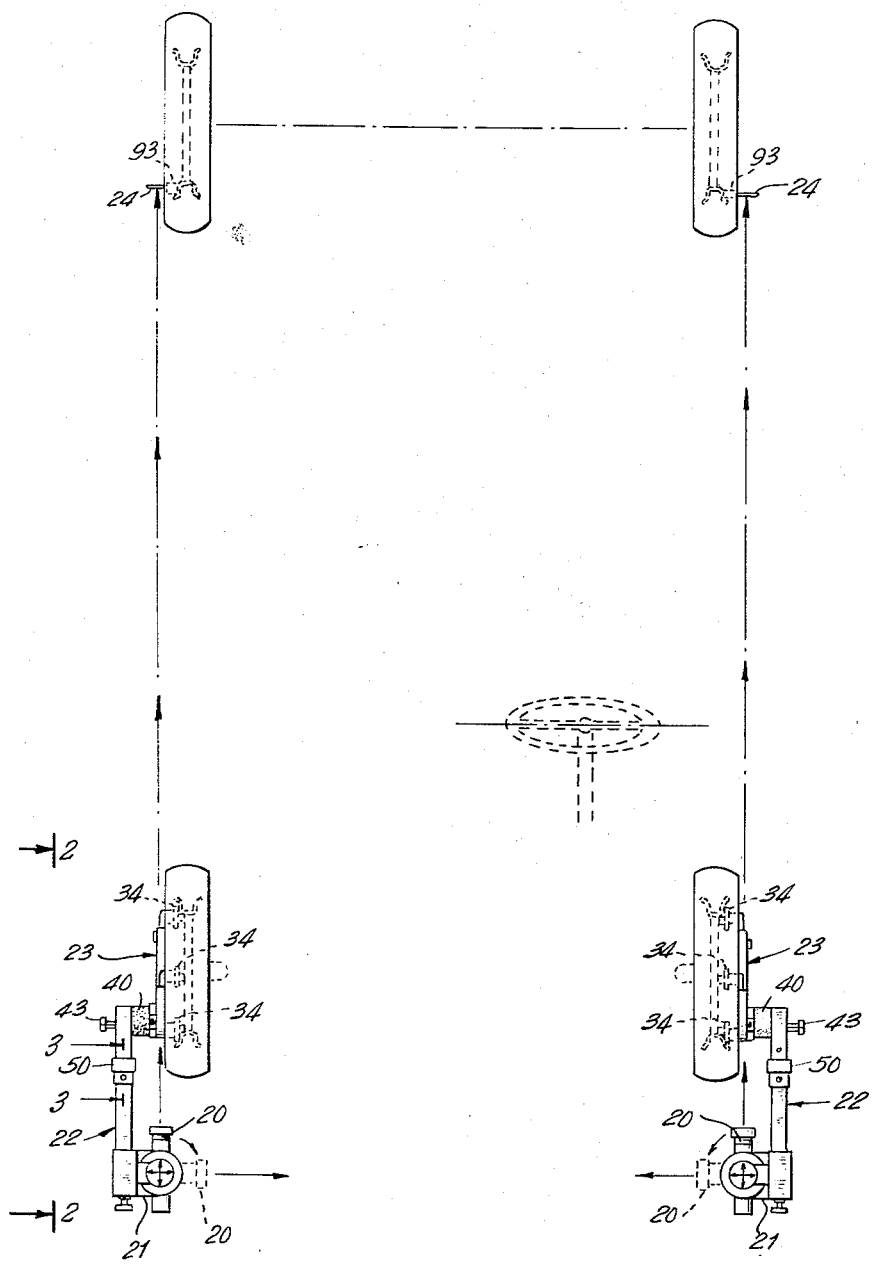

Referring to FIGURE 1 of the drawings, the wheel checking instrument of the present invention is shown mounted on the automobile or other vehicle to be checked. The instrument comprises generally a light beam projector 20 which is mounted to a supporting assembly 21 on each side of the vehicle, a two-piece supporting arm 22 extending forwardly from each front wheel of the vehicle to the front of the vehicle so that the respective light beam projector 20 is mounted in front of and to side of the vehicle, and a mounting 23 which mounts the respective supporting arm 22 to the respective front wheel of the vehicle. The light beam projectors are rotatably mounted on their respective supporting assemblies. In the positions shown in the broken lines in FIGURE 1, each projector projects its respective light beam on a target face of the opposite light projector. In the positions shown in solid lines in FIGURE 1, the light beam projectors each project their light beams on the grid of a target 24 mounted on the corresponding rear wheel of the vehicle. The target grids have equally spaced horizontal and vertical lines thereon and are preferably translucent so that the projected light beam is visible on both sides of the grid.

Figure 2:
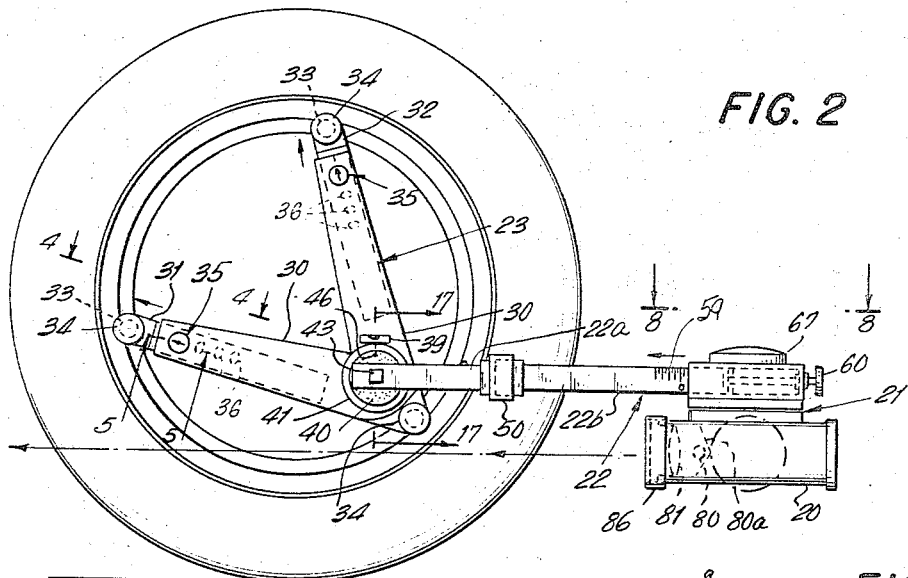
Figure 3:
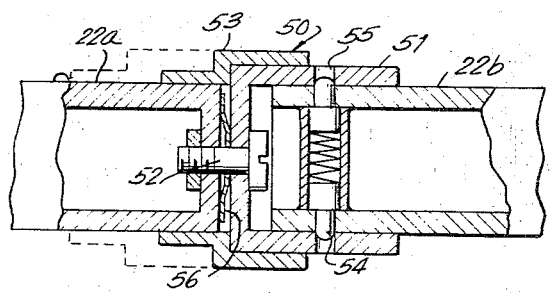
Figure 4:
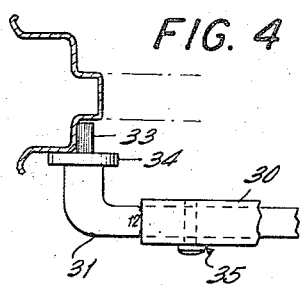

The wheel mountings 23 can best be described with reference to FIGURES 2 through 7 of the drawings. The wheel mountings 23 each include a V-shaped mounting member 30, and an extensible arm 31 accommodated for adjustable movement in one arm of the V-shaped mounting and an extensible arm 32 accommodated for adjustable movement in the other arm of the V-shaped mounting. As best shown in FIGURE 4, the end of each of the arms 31 and 32 is bent inwardly and carries a longitudinally serrated pin 33 which engages the inner surface of the felloe of the respective wheel and a magnetic disc 34 which engages the side surface of the wheel felloe. The apex of the V-shaped member 30 also has a laterally extending serrated pin which engages the inner surface of the wheel felloe and a magnetic disc which engages the side surface of the wheel felloe. In mounting the V-shaped mounting 30 to the wheel, it is placed within the wheel felloe with the arms 31 and 32 pushed inwardly toward the apex thereof, and then the arms 31 and 32 are extended to bring the pins carried by the arms and the pin carried by the V-shaped mounting into engagement with the wheel felloe. The arms are then locked in their adjusted positions by rotatable locking elements 35.

Figure 5:
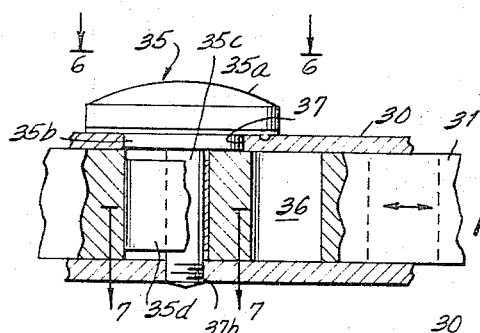
Figure 7:
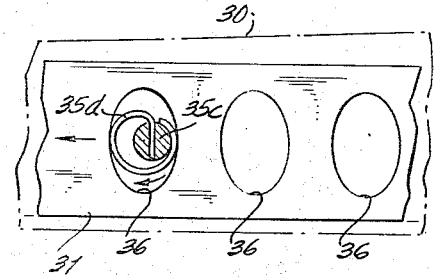
Figure 6:
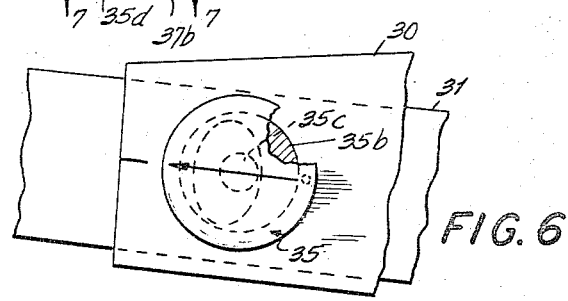

The locking elements 35 each include, as best shown in FIGURE 5, an adjustable head 35a, a disc-like journal 35b adjacent the head, a shaft 35c extending from one side of the disc-like journal and an eccentric coil spring 34d carried by the shaft 35c. The arms 31, 32 each have a plurality of closely spaced oval holes 36 therein which, when the arms are extended into engagement with the wheel felloes, will bring one of the oval openings 36 into substaantial alignment with a larger hole 37 in one side of each of the arms of the V-shaped mounting 30 and a smaller threaded hole 37b in the other side thereof. When the arms 31, 32 are moved into engagement with wheel felloes, the locking elment is oriented with respect to the opening 36 such that the wide portion of the spring 35d is aligned with the wide portion of the oval opening 36, and the shaft 35c of the locking element is inserted through the hole 37 and the appropriate opening 36 and into the smaller hole 37b of the mounting. When the locking element is thus inserted, the holes 37 and 37b serve as bearings for the journal 35b and the threaded portion of the shaft 35c, respectively, and the locking element is rotated approximately 90° to a position shown in FIGURE 7 where the eccentric portion of the spring exerts a force between the V-shaped mounting and the respective arm 31 or 32, pushing the pins 33 into engagement with the wheel felloe and thus locking the wheel mounting 23 within the rim of the respective wheel.

It should be mentioned at this point that the V-shaped mounting 23 carries a liquid level 39 so that it can be properly oriented with the wheel before it is locked to the wheel. This will insure that the fore-and-aft arm 22 is mounted at the proper angle to support the projector 20 at the proper level.

With the V-shaped mounting 23 thus locked in place within the rim of the wheel, the arm 22 of the instrument is then mounted to the V-shaped mounting. The arm 22, as best shown in FIGURES 2 and 17, carries an annular magnet 40 at its rearmost end which magnetically clamps the arm 22 to the V-shaped mounting. Toward this end, the V-shaped mounting has a disc 41 of ferrous or other paramagnetic material affixed to it by a hub 42 which projects outwardly from the center of the disc 41. The hub 42 is held against rotation by a friction washer 42a adjustably controlled by a locking nut 42b so that the arm 22 will normally be held at any adjusted position, but the arm can be forceably raised or lowered. The outer end of the hub 42 has a non-circular opening therein into which the end of a complementary spring-urged plunger 43 carried by the arm 22 is inserted. The spring-urged plunger 43 passes through a hollow portion of the arm 22, and the plunger accommodates a compressed spring 44 thereon which acts against a collar 45 affixed to the plunger, urging the plunger into the opening in the hub when the arm is properly oriented with the hub. This adjustment can be facilitated by markings 46 (see FIGURE 2) on both the disc 41 and the magnet 40. The magnet holds the arm to the V-shaped mounting and the engagement of the plunger with the complementary non-circular recess in the end of the hub 42 prevents rotation of the arm 22 with respect to the V-shaped mounting 30 unless friction control is exceeded.

The arm 22 includes a non-circular (e.g., rectangular) rear portion 22a and a non-circular forward portion 22b connected by an adjustable coupling 50 which in one position prevents and in another position permits the forward portion 22b to rotate about the axis of the arm relative to the rear portion 22a. The coupling 50 includes a sleeve-like element 51 connected by a screw 52 to the end of the rear portion 22a of the arm, a slidable non-circular sleeve 53 carried by the forward end of the portion 22a of the arm and moving into telescoping relationship with the non-circular sleeve 51, and spring-urged elements 54 carried at the rear end of the forward portion 22b of the arm which snap-lock into engagement with holes 55 of the sleeve-like element 51. A yielding spring element 56 is interposed between the sleeve-like element 51 and the forward end of the rear portion 22a of the arm to provide friction which, unless overcome, prevents rotation of the arm portion 22b relative to the arm portion 22a. The sleeve-like element 51 and the arm portion 22b are locked against rotation when the slidable sleeve 53 is in telescoping relation with the element 51, as shown in FIGURE 3, and the sleeve 51 and arm portion 22b rotate as a unit when the slidable sleeve is shifted to the position shown in broken lines in FIGURE 3.

The supporting assembly 21 for the projector 20 is supported at the forward end of the arm portion 22b and is adjustable for forward and rearward movement thereon. The forward end of the arm 22b is non-circular, and as best shown in FIGURE 8, the movable assembly 21 is supported thereon for adjustment in a fore-and-aft direction by turning a knob 60 which imparts rotation to a shaft 61 threadably coupled to the forward end of the portion 22b of the arm. The adjusted position of the movable assembly can be read on a scale 59 (see FIG. 2) carried on the arm portion 22b. A stop 62 carried by the threaded shaft 61 within the interior of the arm portion 22b limits the displacement of the assembly 21 with respect to the arm portion 22b in a forward direction.

The light beam image projectors 20 are each supported from a plate 65 of the projector support 21 by a vertical shaft 66 threaded at its upper end to the plate 65 and having a head 66a at the lower end thereof. A circular liquid level indicator 67 is threaded on the extreme upper end of the shaft 66 on top of the plate 65. The rotatable light beam projector 20 is connected to a circular indicating dial 68 by a sleeve 69 which rotates on a non-threaded portion of the shaft 66, a washer 70 affixed to the base of the dial 68, and a plurality of splines 71 which connect the sleeve 69 to the washer 70. The light beam projector 20 and the corresponding dial 68 thus rotate as a unit.

The liquid indicator 67 is a circular transparent casing having an upper convex surface and filled almost entirely with a liquid so as to leave an air bubble 72 therein. The upper convex surface of the liquid indicator has a plurality of calibrated concentric lines 73 thereon, and in addition, diametral transverse and fore-and-aft reference lines 74 and 74' respectively. When the liquid indicator 67, and hence also the respective light beam projector 20, is in a horizontal plane, the bubble 72 will be visible at the center of the upper face, and when the indicator is tilted, the bubble will be displaced from the center. The lines 74, 74' on the liquid indicator are reference lines for reading scales on the dial 68 indicating the angle of rotation of the light beam propector 20, the 0° positions being the reference fore-and-aft and transverse positions shown in FIGURE 1 of the drawings. For ease in reading the dial 68, both the outer periphery and the upper surface carry scales marked in degrees ranging from zero to thirty degrees in each direction from zero.

When the front wheels are in their straight ahead positions, the arms 22 leveled to center the bubbles of the liquid indicators 67, and the projectors set at their 0° transverse positions as read on the dials 68, the light beams projected by the projectors are reference lines parallel to the axes of their respective wheels.

The light beam projectors 20 are more frequently used in their transverse and fore-and-aft 0° positions and in positions 20° in both directions from the 0° transverse position. To facilitate these adjustments, the projectors 20 each carry an overhead circular plate 78 containing spring urged balls 79 which engage detents in the underside of the support 21 at each of these positions.

The light beam projector 20, as best shown in FIGURES 8 and 9, includes a casing containing a battery-operated light source 80, a reflector 80a, a collimating lens 81, a glass or transparent plate 82, and a slotted disc 83 rotatably mounted on a shaft 84 to the center of the transparent disc 82. The lens 81 and the glass plate or disc 82 are both accommodated within an annular frame 85 which is threaded onto the end of the projector casing. The slotted discs 83 of the light beam projectors 20 cause each projector to project narrow beams of light on the rear target 24 or the target face of the slotted disc of the opposite projector, the narrow bands of light serving as reference lines to be read relative to lines or scales on the target faces. FIGURES 12 and 13 show the slotted discs 83' and 83" used in each of the projectors. Both discs carry weights 85 which maintain the discs oriented in the desired positions. The disc 83' shown in FIGURE 12 has a radially extending vertical slot 83a at the 12 o'clock position thereof and a radially extending horizontal slot 83b at the 9 o'clock position thereof. The disc 83" shown in FIGURE 13 has a radially extending vertical slot 83c at the 6 o'clock position thereof and a radially extending horizontal slot 83d at the 9 o'clock position. When the light beam projectors 20 are directed toward each other, the target face of the disc 83' of one image projector serves as a screen on which light bands are visible from the light beams projected through the slots 83c and 83d of the disc 83'' of the opposite image projector, and vice versa. If, for example, the projectors are oriented to lie on the same axis, as shown in FIGURES 15 and 16, light bands passing through the slots 83a and 83b would be visible as reference lines on the face of the disc 83'' at the 12 and 3 o'clock positions, respectively. Similarly, the light bands passing through the slots 83c and 83d of the disc 83'' would be visible as reference lines at the 6 and 3 o'clock positions, respectively, of the disc 83'.

In addition to being trained on each other, the light beam projectors 20 can be rotated rearwardly and the light bands passing through the vertical and horizontal slots of each can be viewed on the targets 24 affixed to the rear wheels.

A preferred form of the target 24 is shown in FIGURE 14 of the drawings. The front face thereof, preferably translucent, has a grid of vertical and horizontal lines thereon. The target 24 is magnetically clamped against a reference plane surface of the felloe of the rear wheel by a pair of arms 90 and 92 having magnets 91 and 93, respectively, at the ends of the arms. The lower arm 90 extends laterally from the target, and the upper arm 92 can be pivoted from the vertical position shown in broken lines in FIGURE 14 to the horizontal position shown in solid lines. With the target thus magnetically clamped to a plane surface of the rear wheel, the positions of the light beams produced by the projectors on the rear targets can be compared with each other in respect to their relative positions and angular relationship with the vertical and horizontal lines on the target. The target 24 carries a counterweight 94 to counterbalance the weight of the arm 90 and the magnet 93 so that the target can be suspended from the arm 92 in vertically disposed position.

The V-shaped mounting 23 for the wheel checking instrument has a paramagnetic surface 41 against which the magnet 40 of the fore-and-aft supporting arm 22 is magnetically clamped. FIGURES 18 and 19 of the drawings show a simplified alternative mounting device which can be used for mounting the instrument to vehicles having wheel hubs 95 made of steel or other paramagnetic materials. In this embodiment, the mounting magnet 40' is magnetically clamped directly to the wheel hub and properly oriented with respect to the wheel hub by the engagement of a spring-urged pin 43' in the axial countersunk hole normally found in the end of the wheel spindle. The rear portion 22a' of the fore-and-aft arm 22 is supported from the rim of the wheel by a magnetic disc 96 which is carried by the arm portion 22a' by a bracket 97 adjustable in fore-and-aft directions on the arm portion 22a'. An eccentric shaft 98 is rotatably supported in the bracket 97, and a ball-and-socket universal coupling 99 connects the eccentric end of the shaft 98 with the magnetic disc 96. The forward portion 22b of the instrument is the same as shown and described in the preferred embodiment, and it is connected to the rear arm portion 22a' by the coupling 50 described above. The bracket 97 carries a locking screw 100 for locking it in place on the arm portion 22a'. When the locking screw 100 is loose, the bracket 97 can be adjusted and the position of the shaft 98 and the magnetic disc 96 shifted with respect to the wheel. The end of the shaft 98 also carries a knob 101 by means of which the eccentric shaft 98 can be rotated to raise and lower the arm 22 until the bubble of the liquid level indicator lies on the reference lines 74, indicating that the instrument is in horizontal position. The locking screw 100 can then be tightened to maintain the supporting arm in proper position.

In the use of the wheel checking instrument, the front wheels of the vehicle are preferably, but not necessarily, placed on rotatable discs or turntables (not shown) of equal height to facilitate turning of the wheels, and if this is done a plate or platform of equal height should be placed under each of the rear wheels. The light beam projectors 20 and the rear targets 24 are then mounted to the appropriate wheels of the vehicle in the manner described above.

With the front wheels in their straight-ahead positions and the light beam projectors 20 adjusted toward each other at their 0° positions, the position of the light beam projected by the vertical slot 83a on the face of the disc 83'' with respect to the horizontal scale thereon and the position of the light beam projected by the vertical slot 83c on the face of the disc 83' with respect to the horizontal scale thereon should give the same toe-in or toe-out reading for the vehicle, the reading indicated on each of the scales being one-half the true value. The actual toe-in of the vehicle can be obtained by adjusting one of the projectors 20 in a fore-and-aft direction on the fore-and-aft supporting arm by the rotation of the knob 60 until the light beam projected through the vertical slot of projector 20 falls on the zero toe-in position of the opposite horizontal scale, the toe-in reading being indicated by the vertical band of light on the scale of the opposite projector.

If the readings on the faces of the opposite targets 83 of the projectors 20 are not equal at the 0° positions of the dials 68, it indicates that one front wheel may be offset in a fore-and-aft direction from the other or that the tracking of the vehicle is improper due to some condition at the front end of the vehicle. This condition should be corrected, but nevertheless, the toe-in of the vehicle can be checked without correcting the condition inasmuch as the adjustment of the one projector by the rotation of the control knob 60 will compensate for the problem.

The camber of the front wheels can be checked with the wheels in the straight-ahead position and the projectors 20 adjusted toward each other at the 0° positions of the dials 68. The camber can be read by the positions of the light band projected through the horizontal slot 83b with respect to the vertical scale on the face of the disc 83'. If both camber readings are not equal, it indicates that the cambers of the two front wheels are not the same. By checking the relative positions of the bubbles of the liquid indicators 67 with respect to the reference line 74' the operator can determine at a glance what the camber conditions are for the front wheels and is thereby guided in making the necessary adjustments.

To check the tracking of the vehicle the projectors 20 are rotated to their 0° transverse positions, and, if necessary to compensate for any front end distortion detected during the check of toe- in and not yet corrected, one of the projectors is adjusted in a fore-and-aft direction by the rotation of the knob 60 until the toe-in readings on both discs 83 are equal, the scale 59 indicating the amount of the track distortion. The projectors are then rotated 90° to project their beams on the rear targets 24. If the tracking of the vehicle is proper, the light beams from both projectors should fall at corresponding positions on the surfaces of the respective targets 24. The targets 24 can, of course, be dispensed with and the projectors can be rotated to cast their beams on corresponding positions of the rear tires, in which case the tracking of the vehicle will be proper if in the adjusted positions of the projectors the readings on the dials 68 are the same.

If the check of tracking shows distortion, it may be due to a condition of the frame, the rear housing, or both. To detect and isolate distortion in the frame and rear housing, the projectors 20 are pre-set at their 0° fore-and-aft positions with the front wheels straight ahead. The wheels are then turned in one direction to a position at which the vertical light beam of the one projector strikes either a part of the diametrically opposite rear corner of the frame or a rear target 24 hanging perpendicularly from some fixed point at the opposite corner of the rear frame. The projector thus lined up with the rear target is then rotated to project its vertical beam on the "0" position on the horizontal scale of the target disc 83 of the opposite projector (the opposite projector being set at the 0° transverse position of the dial 68), and the angle of rotation of the projector is noted. The front wheels are then turned in the opposite direction to line up the other projector with a corresponding part or a target suspended from a corresponding fixed point at the opposite corner of the rear of the frame. The projector thus lined up is rotated to project its vertical beam on the "0" position of the target disc of the opposite projector (the said opposite projector being set at the zero degree transverse position of the dial 68), and the angle of rotation of the projector is noted. If identical readings on th edials 68 are not obtained, a distortion of the frame would be indicated. By carrying out the same operation with respect to a fixed point on the opposite rear wheels of the vehicle, the presence of distortion in the rear housing can be detected.

The adjustment of the control knob 60 provides a means whereby the steering wheel can be centered accurately by isolating the tracking distortion from the toe-in reading. The adjustment of the control knob 60 makes it possible to compensate for tracking distortion, and once that is done, the front wheels are adjusted until the light beams of the respective projectors strike corresponding parts at the rear of the evhicle. The steering wheel can now be locked in its centered position and the toe-in adjusted to its correct value on each side, even though tracking has not been corrected.

Incidentally, with the image projectors in their fore-and-aft 0° positions and the front wheels in the straight-ahead positions, the relative camber of the rear wheels may be observed by the angular relationship between the light beams and the grid lines on the rear targets.

The instrument can also be removed from the front wheels and mounted on the rear wheels to measure the camber, toe-in, and such other checks as may be desired.

To check the caster of the right front wheel, both projectors 20 are pre-set by rotating them in a counterclockwise direction when viewed from above to the 20° positions of their respective dials 68, and the wheels are turned 20° to the right to bring the beam projected through the vertical slot of the right wheel projector on the "0" position of the horizontal scale of the opposite target face 83. The couplings 53 of both supporting arms 22 are shifted to uncouple the forward portions 22b of the arms, and the bubbles of both liquid indicators 67 are centered. At these positions, the positions of the horizontal light bands relative to the vertical scales on both wheel target discs 83 are noted as indicating the relative caster between the wheels. The projectors 20 are then both rotated 40° in a clockwise direction when viewed from above past the 0° positions to positions 20° on the other sides of the 0° positions, the front wheels are turned 40° to the left until the light beam projected through the vertical slot of the right wheel projector falls on the "0" position of the horizontal scale of the opposite target face, the side arms are leveled to bring the bubbles of the respective liquid indicators 67 into registry with the reference line 74, and position of the horizontal light beam relative to the vertical scale on the left wheel target disc 83 is noted, indicating the caster of the right wheel. The caster value of the right wheel can now also be read on the liquid indicator 67 associated with the right wheel. The operation can be repeated for the left wheel, or the left wheel reading can be noted as showing the reverse polarity of the reading.

To check toe-out on curves, both projectors are turned 20° in a counterclockwise direction as viewed from above, and the front left wheel is then turned to the right until the vertical light beam projected by the left wheel projector is brought to the "0" position of the horizontal scale of the target face of the right wheel projector. The position of the vertical light beam projected by the right wheel projector relative to the horizontal scale of the target face of the left wheel projector indicates the relative toe-out of the right wheel. The operation is repeated in similar fashion, the right wheel being turned to the left to determine the relative toe-out of the left wheel.

In order to check kingpin or ball joint inclination, the wheel to be checked is turned to a 20° position (right wheel turned to right, left wheel to the left), the bubble of the liquid indicator 67 is adjusted to be in registry with the transverse index line 74, and the front wheels are then turned in the opposite direction to bring the wheel to be checked to the opposite 20° position and the position of the bubble of the liquid indicator relative to the index line 74 will indicate the kingpin inclination.

The instrument of the present invention can be used in a great many additional ways to make the checks discussed above or, for that matter, to make other checks, such as the relative spring heights at each of the four corners of the vehicle, toe-in changes under load, and others.

The invention has been shown and described in preferred forms and by way of example only, and obviously, many other variations and modifications are possible within the spirit of the invention. For example, although light beam projectors are described herein for projecting a reference line from one side or end of the vehicle to the other, nevertheless, the reference lines can also be projected by a telescope as a line of sight, by a mechanical connection or by other means. The invention, therefore, should not be limited to any particular form or embodiment, except insofar as such limitations are expressly set forth in the claims.

I claim:

1. A checking instrument comprising a rotatable reference projector mountable on each side of a vehicle beyond the end thereof so that the projectors can be directed toward each other or against a reference target at the opposite end of the vehicle, support means for each projector, said support means including at least two parts, means mounting a first part of the support means to a wheel of the vehicle, means connecting a second part of the support means to the first part for rotation about an axis fore-and-aft of the vehicle, permitting rotation of the second part with respect to the first part, the projectors being carried by the second parts of the support means, a scale for indicating the angle of adjustment of each projector, a scale carried by each support means on which the reference line of the opposite projector is projected, and means indicating the fore-and-aft and transverse levels of each projector.

2. A checking instrument comprising a light image projector at each side of the vehicle and beyond the end thereof rotatable about an upright axis to project a reference line across the front from one side of the vehicle to the other or along one side of the vehicle to the opposite end thereof, means for mounting each projector with respect to a reference plane of the respective wheel, indicating means showing the position of adjustment of said rotatable projector to project a reference line parallel to the axis of the respective wheel, a screen carried by each rotatable projector on which the light image from the opposite projector can be viewed, both screens being visible from the front of the vehicle so that the light images on both screens can be viewed simultaneously, and a toe-in scale having a horizontal coordinate on each of the said screens.

3. A checking instrument as set forth in claim 2 including means for orienting said screen to adjust the horizontal coordinate to horizontal position.

4. A checking instrument adapted to be mounted on the wheels of a vehicle comprising a pair of arms which, when mounted on the front wheels and the front wheels are straight ahead, extend forwardly along both sides to the front of the vehicle, mounting means for mounting each arm to the respective wheel against a reference plane of the wheel, reference line directing means carried by each arm at a position in front of and to the side of the vehicle and rotatable on a substantially upright axis to direct a reference line across the front of the vehicle from one side to the other or along the side of the vehicle from the front to a target at the rear depending upon the rotational position of the rotatable means, indicating means showing the position of adjustment of said rotatable reference line directing means and including a reference which permits the setting of the reference line directing means to a position to direct the reference line parallel to the axis of the respective wheel, and a scale carried by each arm onto which the reference line is directed when the reference line directing means is adjusted to direct the reference line across the front of the vehicle from one side to the other.

5. A checking instrument as set forth in claim 4 including rotatable means supporting each reference line directing means for rotatable adjustment on a substantially fore-and-aft axis relative to its respective supporting arm.

6. A checking instrument as set forth in claim 4 in which the reference line directing means is carried by the respective arm at a height to permit directing the reference line diagonally beneath the vehicle from one side at the front to a target at the other side at the rear of the vehicle.

7. A checking instrument as set forth in claim 4 including a liquid level carried in fixed relation to the rotatable means and having a bubble movable 360° from a reference point which indicates that the reference line is directed horizontally irrespective of its rotational setting in a transverse or a fore-and-aft setting relative to the vehicle.

8. A checking instrument as set forth in claim 4 in which the support for each reference line directing means is separated into a first part mounted to the wheel and a second part supporting the reference line directing means and rotatably mounted on a fore-and-aft axis to the first part, and including a coupling movable with respect to said fore-and-aft axis from an uncoupled to a coupled position, permitting the second part to be rotated with respect to the first or locked against such rotation.

9. A checking instrument as set forth in claim 4 in which each mounting means includes a mounting, at least two arms accommodated in the mounting and adjustable relative to the mounting at angles to each other, wheel engaging means carried by each of the arms and the mounting to engage a wheel felloe, reference means carried by each arm and the mounting and engaging with a reference plane of the wheel and a resilient locking means interposing a resilient force between each arm and the mounting for locking the mounting to the wheel.

10. A checking instrument as set forth in claim 4 in which each mounting means includes means connecting the support to a reference surface of the wheel, a wheel felloe engaging magnet, an adjustable slide carried by the support, and a rotatable eccentric shaft carried by the slide and carrying the magnet at one end thereof.

11. A checking instrument as set forth in claim 4 including a support for the reference line directing means adjustable in a fore-and-aft direction relative to the respective mounting, permitting the said reference line directing means to be adjusted in a fore-and-aft direction to compensate for distortion in tracking when the reference line is directed across the front of the vehicle to the scale at the other side.

12. A checking instrument as set forth in claim 11 including an indicator carried by each mounting and indicating the fore-and-aft position of each reference line directing means.

13. A checking instrument as set forth in claim 4 in which the said reference line directing means is a light beam projector which projects a sharp image on the scale or target toward which the reference line is projected.

14. A checking instrument as set forth in claim 13 in which the light beam projector includes an apertured disc through which the light beam is directed and for defining the image to be projected onto the scale or target.

15. A checking instrument as set forth in claim 14 in which the aperture is a slot and including means for pivotally supporting the disc at its center and means for weighting the disc so that it is self-orienting.

16. A checking instrument as set forth in claim 13 in which each projector includes a light source, a lens and a slotted wall through which the light is directed, thereby forming a light beam, the said target surface being the side of the slotted wall opposite the light source.

17. A testing instrument as set forth in claim 16 in which the slotted wall includes means difining vertical and horizontal slots and the scale means on the target surface includes vertical and horizontal scales.

18. A checking instrument as set forth in claim 17 in which, when the projectors are adjusted toward each other on the same axis, the vertical slots of each slotted wall are on the same plane but offset from each other on opposite sides of the axis and the horizontal slots of each wall are on the same plane but offset from each other on opposite sides of the axis.

19. A checking instrument as set forth in claim 17 in which the horizontal scale indicates toe-in and the vertical scale indicates camber and caster.

References Cited

UNITED STATES PATENTS

| | | | |
|---|---|---|---|
| 2,292,968 | 8/1942 | Peters | 33—46.2 |
| 2,689,403 | 9/1954 | Wilkerson | 33—46.2 |
| 2,882,608 | 4/1959 | Tursman | 33—203.16 |
| 2,972,189 | 2/1961 | Holub | 33—203.2 |
| 3,081,546 | 3/1963 | Wilkerson | 33—46.2 |
| 3,266,150 | 8/1966 | Mussant | 33—46.2 |

FOREIGN PATENTS 1,158,796   2/1958   France.

LEONARD FORMAN, *Primary Examiner.*

W. MARTIN, JR., *Assistant Examiner.*